2,959,496
CYANOETHYLATION OF WOOD

Roy H. Baechler, Forest Products Laboratory,
Madison 5, Wis.

No Drawing. Filed Sept. 6, 1957, Ser. No. 682,558

1 Claim. (Cl. 117—118)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to a method of treating wood and has for its object the treatment of wood whereby the chemical composition of the cellulose is modified so that the treated wood is not subject to attack by wood-destroying fungi.

According to the invention, a piece of wood, such as a block is impregnated with an aqueous solution containing acrylonitrile and ammonia and the impregnated piece of wood then held at approximately 100° C. or slightly above to react the acrylonitrile with the cellulose of the wood. The effect of this process is to render the wood resistant to attack by wood-destroying fungi without seriously weakening the wood.

When wood so treated is ground into fine sawdust and then extracted with hot water or alcohol, the hot water extract when mixed with nutrient agar has no inhibiting effect on the growth of the wood-destroying fungus Madison 517. The alcoholic extract has not effect in excess of the effect of the amount of alcohol which it contains. This shows that the decay resistance is not due to the presence of toxic materials in the treated wood but rather is due to a modification of the chemical constitution of the cellulose contained in the wood.

Wood that is free from toxic materials is more suitable for use in contact with food and drinking water than is wood treated by conventional processes which depend for their effect upon the deposition of toxic materials in the wood. This is an important feature of this invention.

In carrying out the invention, the piece of wood is treated with an aqueous solution of acrylonitrile and ammonia with the concentration of the treating solution and conditions of treatment being such that the wood retains a minimum of acrylonitrile corresponding to about 2 percent of the weight of the wood and a minimum of ammonia corresponding to about 1.5 percent of the weight of the wood and a maximum of ammonia corresponding to about 3.0 percent of the weight of the wood.

The following example may be given as a representative composition of the treating solution for readily-treated wood such as pine, when the solution is impregnated by a conventional full-cell pressure process:

| | Parts by weight |
|---|---|
| Acrylonitrile ($CH_2CHCN$) | 2 |
| Ammonia ($NH_3$) | 1.5 |
| Water | 96.5 |

The amount of acrylonitrile present in the treating solution may be varied according to such factors as species of wood being treated, and method of treatment being used. A solution of at least 1.5 percent acrylonitrile is required for use for readily treated wood such as pine, which, when properly treated, will absorb 30 pounds and upwards of treating solution. For treating species that are more difficult to impregnate whereby a lower retention of treating solution is attainable, the concentration of the treating solution should be increased sufficiently so that the required absorption of chemical is obtained. The concentration of the acrylonitrile should be increased somewhat above the minimum amount of about 1.5% required when treating a charge of timbers of greatly diverse sizes whereby there is a well-known tendency for the larger pieces to absorb less than the overall average amount of solution. Excess acrylonitrile does not reduce the effectiveness of the treatment but is undesirable from the standpoint of cost.

The concentration of ammonia used should range from about 1.5% to about 3%, the upper limit being employed when treatments are made whereby a considerable portion of the vessel used to treat the wood is unoccupied by wood or when treatment is applied to acidic species such as oak. A large excess of ammonia should be avoided because of its deleterious effect on the strength of wood.

While certain other alkalies will promote the desired reaction between acrylonitrile and wood, I prefer to use ammonia because of its volatility which permits its removal after the desired reaction has been obtained and thus minimizes the gradual deleterious effect that alkalies have on wood.

Of the various well-known methods of treating wood, pressure impregnation is most practical. It results in effective distribution of the chemicals in the wood and also makes it possible to limit the hazard due to the toxic effect of acrylonitrile vapors. The use of conventional full-cell pressure process is preferred. In treating a particular species of wood, the specification of the American Wood Preservers' Association applying to the treatment of that species with waterborne preservatives should be followed.

The treating solution should be applied at a temperature of approximately 25° C. While a somewhat higher temperature up to about 60° C. will yield satisfactory results, it is accompanied by some loss of chemical due to undesired side reactions. After a pressure period of sufficient time and intensity to yield the desired absorption of solution by the wood, as shown by the conventional gage readings, the solution should be drained from the cylinder. Steam at a pressure of about 15 pounds per square inch should then be admitted to the cylinder and held for a period of approximately 2 hours for lumber 1 inch in thickness. A longer steaming period is necessary for thick timbers but because of the adverse effect of long steaming at 15 pounds on the strength of the wood, a steaming period of 18 hours should not be exceeded. For wood products having maximum strength requirements, steam at atmospheric pressure should be used and the steaming period should be doubled.

The wood should then be seasoned to reduce the moisture content and to permit evaporation of any unreacted acrylonitrile remaining in the wood. Whatever method of seasoning is used, the toxicity of acrylonitrile vapors must be taken into account.

Southern pine sapwood blocks when treated by the process as described and then tested by the ASTM tentative standard "Soil-Block Method for Conducting Decay Tests" have been found to be completely resistant to attack by such well-known wood-destroying fungi as *Lentinus lepideus, Lenzites trabea*, and *Poria monticola*.

Having thus described my invention, I claim:

A method of treating a piece of wood to render it resistant to fungi which comprises impregnating the piece of wood with a solution containing acrylonitrile and ammonia in amounts such that the wood retains a minimum of acrylonitrile corresponding to about 2 percent of the weight of the wood and a minimum and maximum of ammonia corresponding to about from 1.5 percent to 3.0 percent, respectively, of the weight of the wood, and holding the impregnated wood at a temperature of approximately 100° C. to react the acrylonitrile with the cellulose of the wood.

References Cited in the file of this patent

UNITED STATES PATENTS

| | | |
|---|---|---|
| 955,762 | Chisolm | Apr. 19, 1910 |
| 987,888 | Koenman | Mar. 28, 1911 |
| 1,680,529 | Richter | Aug. 14, 1928 |
| 2,332,049 | Bock | Oct. 19, 1943 |
| 2,375,847 | Houtz | May 15, 1945 |
| 2,473,308 | Stallengs | June 14, 1949 |
| 2,535,690 | Miller et al. | Dec. 26, 1950 |
| 2,786,258 | Compton et al. | Mar. 26, 1957 |
| 2,794,736 | Cohen et al. | June 4, 1957 |

OTHER REFERENCES

Daul et al.: Textile Research Journal, March 1955, pages 246–253.